(12) United States Patent
Kanie

(10) Patent No.: US 6,233,792 B1
(45) Date of Patent: May 22, 2001

(54) BUMPER HOLDING CLIP

(75) Inventor: Hideki Kanie, Nissin (JP)

(73) Assignee: Emhart Inc., Newark, DE (US)

( * ) Notice: Subject to any disclaimer, the term of this patent is extended or adjusted under 35 U.S.C. 154(b) by 0 days.

(21) Appl. No.: 09/368,633

(22) Filed: Aug. 5, 1999

(30) Foreign Application Priority Data

Aug. 6, 1998 (JP) .................................................. 10-222965

(51) Int. Cl.[7] ........................... A44B 17/00; B60R 19/00; F16B 5/06
(52) U.S. Cl. ................................. 24/290; 24/289; 24/297
(58) Field of Search .............................. 24/290, 289, 297

(56) References Cited

U.S. PATENT DOCUMENTS

| | | | |
|---|---|---|---|
| 2,330,675 | * 9/1943 | Brown ..................................... | 24/290 |
| 2,531,351 | * 11/1950 | Churchill ................................ | 24/290 |
| 3,478,395 | * 11/1969 | Flora ...................................... | 24/290 |
| 3,897,967 | * 8/1975 | Barenyi .................................. | 24/297 |
| 4,103,400 | * 8/1978 | Munse .................................... | 24/290 |
| 5,448,804 | * 9/1995 | Warren ................................... | 24/297 |
| 5,542,158 | * 8/1996 | Gronau et al. ......................... | 24/289 |

FOREIGN PATENT DOCUMENTS

| | | | | |
|---|---|---|---|---|
| 2091801 | * | 8/1982 | (GB) | ..................................... 24/289 |
| 59-048248A | * | 3/1984 | (JP) | . |
| 60-25643 | * | 6/1985 | (JP) | . |
| 0191851 | * | 9/1985 | (JP) | ..................................... 24/289 |
| 370651 | * | 8/1991 | (JP) | . |
| 8240207 | | 9/1996 | (JP) | . |

\* cited by examiner

*Primary Examiner*—Victor N. Sakran
(74) *Attorney, Agent, or Firm*—Edward D. Murphy

(57) ABSTRACT

A bumper holding clip for fastening an attachment member onto a workpiece, in which the clip includes a base, a holding portion and a fixing portion. The holding portion is formed on one of the surfaces of the base for receiving and holding a supporting portion of the attachment member, such as a bumper. The holding portion has a receiving portion for receiving the supporting portion of the attachment member. The receiving portion is formed on one side of a wall, on which the opposite side has affixed thereto a centrally located resilient holding member that engages the supporting portion of the attachment member from slipping out of the holding portion. The wall is rigid at its opposite corners to immovably support the supporting portion of the attachment member within the receiving portion. The receiving portion is a bag-like insertion groove that has an elongated cross section to receive a plate-like supporting portion of the attachment member. The fixing portion is formed on the other surface of the base and will be attached to the workpiece, such as a vehicle body panel.

4 Claims, 6 Drawing Sheets

BUMPER HOLDING CLIP

BACKGROUND OF THE INVENTION

The present invention relates to a holding clip for holding an attachment member such as a bumper or a front grille of a motor vehicle on a workpiece such as a vehicle body panel.

Holding dips for holding attachment members such as a radiator grille or a front grille on workpieces such as vehicle body panels are disclosed, for example, in Japanese Patent Publications No. 60-25643 and No. 3-70651. These clips are constructed to hold attachment members on workpieces, each clip comprising a base plate, a holding portion formed on one of the surfaces of the base plate for receiving and holding the supporting portion of the attachment member such as a radiator grille, and a fixing portion formed on the other surface of the base plate and adapted to be attached to the workpiece such as a vehicle body panel. When their fixing portions are attached to workpieces, these clips allow attachment members to be held on workpieces only by inserting the supporting portions of the attachment members respectively into the holding portions of the clips.

Japanese Patent Laid-Open No. 08-240207 discloses a temporary fixing clip for fastening which attaches a bumper temporarily in order to thereafter obtain a permanent fixing by using a bolt or the like. This clip also comprises a base plate, a holding portion formed on one of the surfaces of the base plate for receiving and holding the supporting portion of the attachment member such as a bumper, and a fixing portion formed on the other surface of the base plate to be attached to the workpiece such as a vehicle body panel, so that when the supporting portion of the attachment member is simply inserted into the holding portion of the clip, it can hold the attachment member temporarily on the workpiece.

All of the prior-known clips stated above are advantageous in that their mounting operation is easy as it is accomplished by simply inserting the supporting portion of an attachment member into the holding portion of each of the clips. In a case where the attachment member such as a bumper is a heavy article, however, the fastening force is not sufficient to hold it by the clip alone. If a bumper is held on a vehicle body panel only means of any of these prior-known clips, the bumper tends to hang down from the vehicle body panel. This requires troublesome operation or work. That is, after the bumper is fixed temporarily, the operator has to bolt it by one of his hands while supporting it by the other hand so as not to allow it to hang down or sag.

SUMMARY OF THE INVENTION

The present invention aims to provide a holding Clip for a bumper or the like which is capable of sufficiently holding a bumper or some other heavy article against gravity, while maintaining the easy mounting operation.

In order to attain the above-mentioned object, according to the present invention, there is provided a bumper holding clip for fastening an attachment member onto a workpiece, comprising a base, a holding portion formed on one of the surfaces of the base for receiving and holding a supporting portion of the attachment member such as a bumper or the like, and a fixing portion formed on the other surface of the base and adapted to be attached to the workpiece such as a vehicle body panel or the like; characterized in that the holding portion has a receiving portion for receiving the supporting portion of the attachment member, and that a portion of a wall defining the holding portion is formed by a resilient holding member which is associated with an opposite wall to engage with the supporting portion to prevent the received supporting portion from getting out, and at least a portion of the wall portions, excluding the resilient holding member, is made as a rigid wall which immovably support the supporting portion of the attachment member received in the receiving portion within said receiving portion to prevent the body of the attachment member from being shifted from the workpiece. The facilitated or easy mounting operation is maintained by the resilient holding member, and further the rigid walls sufficiently hold a bumper or other heavy articles against gravity.

According to the present invention, the receiving portion may be formed in a bag-like, or closed end, insertion groove having an elongated cross section to receive the plate-like supporting portion of the attachment member, and the resilient holding member may be provided in a first wall portion defining a center portion of the insertion groove, and the rigid walls may be formed by a second wall portion including the corners of the insertion groove on both sides of the holding member. Further, the outer wall of the receiving portion may be connected to the base by means of reinforcing ribs, so that when the insertion groove is in a horizontal position, the supporting portion of the attachment member received in the insertion groove is kept in the horizontal attitude. When the insertion groove is in a horizontal position, the lower wall of the receiving portion can also be extended to form a temporary placing space to guide the supporting portion of the attachment member toward the insertion into the insertion groove. The fixing portion may be formed with a resilient engagement leg to be fixed to the workpiece when inserted into a mounting hole in the workpiece. The fixing portion may be hollowed for a screw to be screwed in the hollow portion to strengthen the fixing force by preventing the engagement leg from bending inwardly. It is also possible that the fixing portion comprises a base hole formed in the base to correspond to a mounting hole in the workpiece, and a bolt and a nut. Between the base and the workpiece, a watertight packing may be provided at least around the fixing portion.

According to the present invention, the resilient holding member maintains the easy mounting operation and the rigid walls are capable of satisfactorily holding a bumper or some other heavy article in own gravity. Particularly, the use of rigid walls in the portions except the resilient holding member to define the insertion groove as the receiving portion prevents the bumper from falling down or sagging. The strength to hold the bumper is maintained even if the number of holding clips is reduced, and the bumper mounting operation becomes easier without the need to support the bumper by hands.

BRIEF DESCRIPTION OF THE ACCOMPANYING DRAWINGS

DETAILED DESCRIPTION OF THE INVENTION

Figure 1:
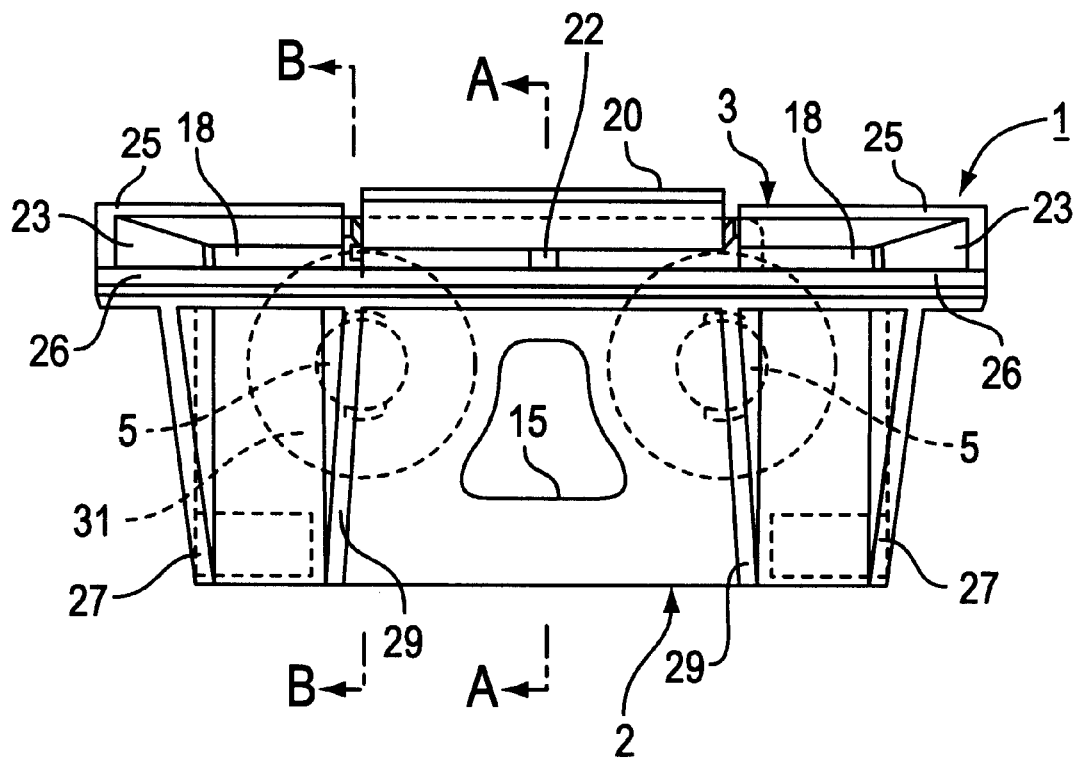
FIG. 1 is a front view of a holding clip 1 according to the present invention.
Figure 2:
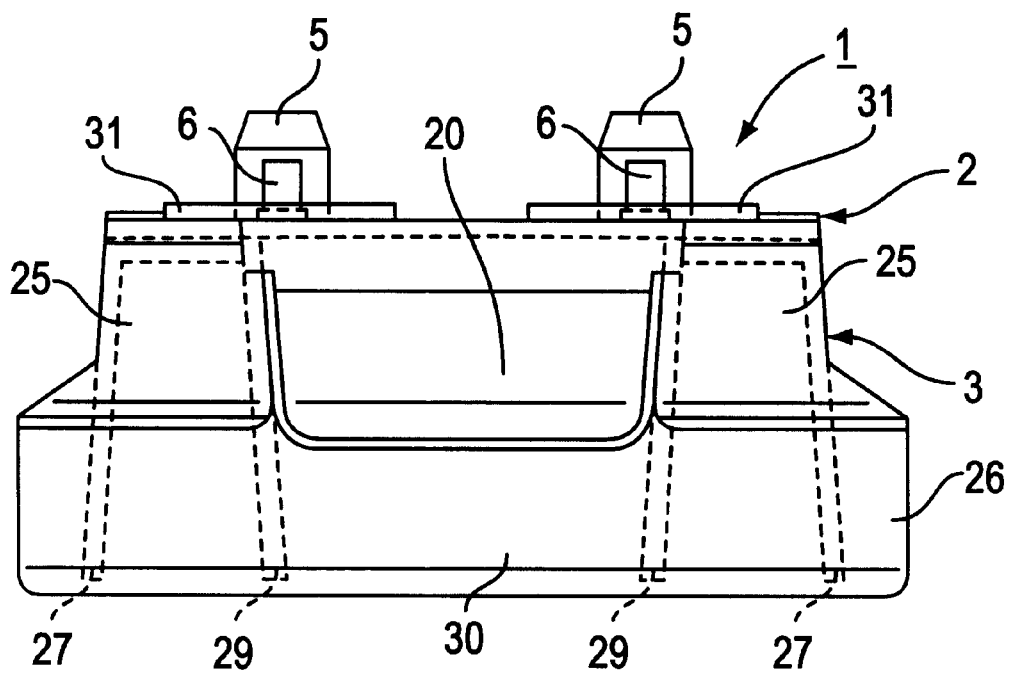
FIG. 2 is a plan view of the holding clip 1 of FIG. 1.
Figure 3:
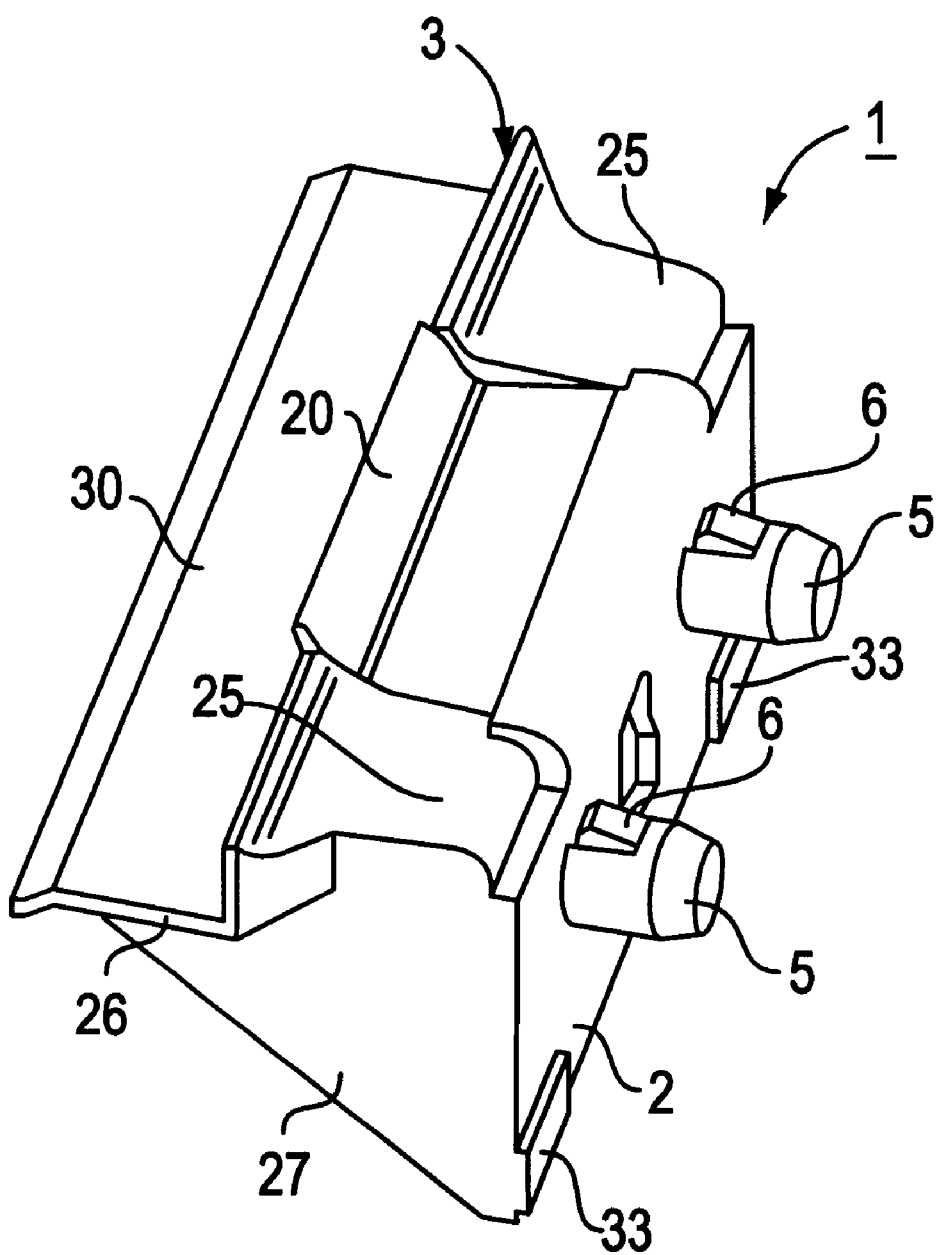
FIG. 3 is a perspective view of the holding clip 1 of FIG. 1, a seen from the backside.
Figure 4A:
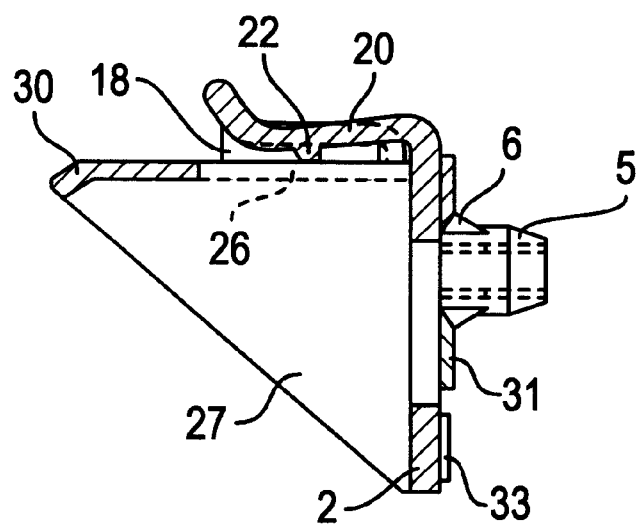
FIG. 4(A) is a sectional view of the holding clip 1 taken along the line A—A of the dip of FIG. 1.
Figure 5:
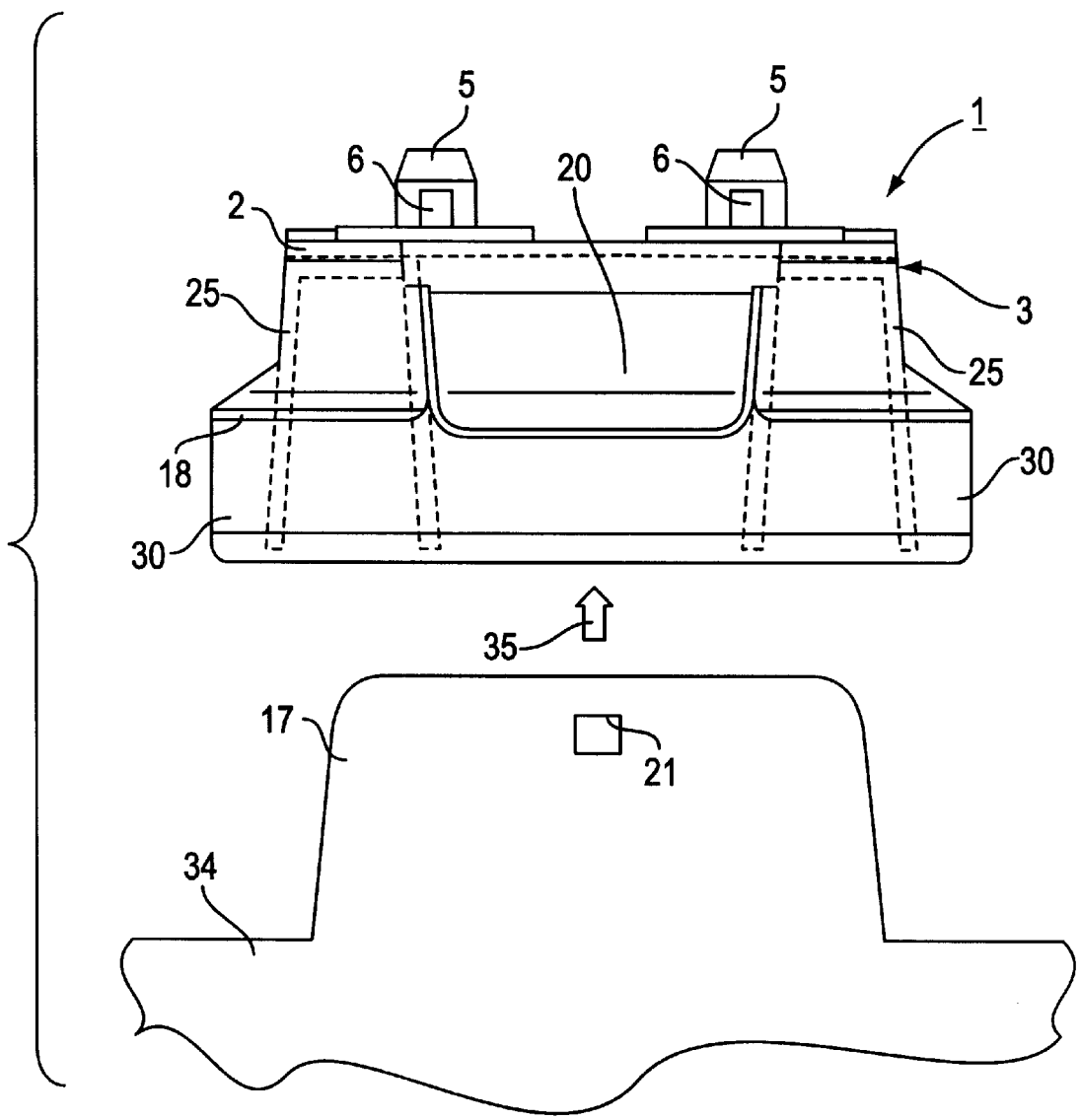
FIG. 5 is a plan view showing how a supporting portion of a bumper is inserted into the holding clip.
Figure 6A:
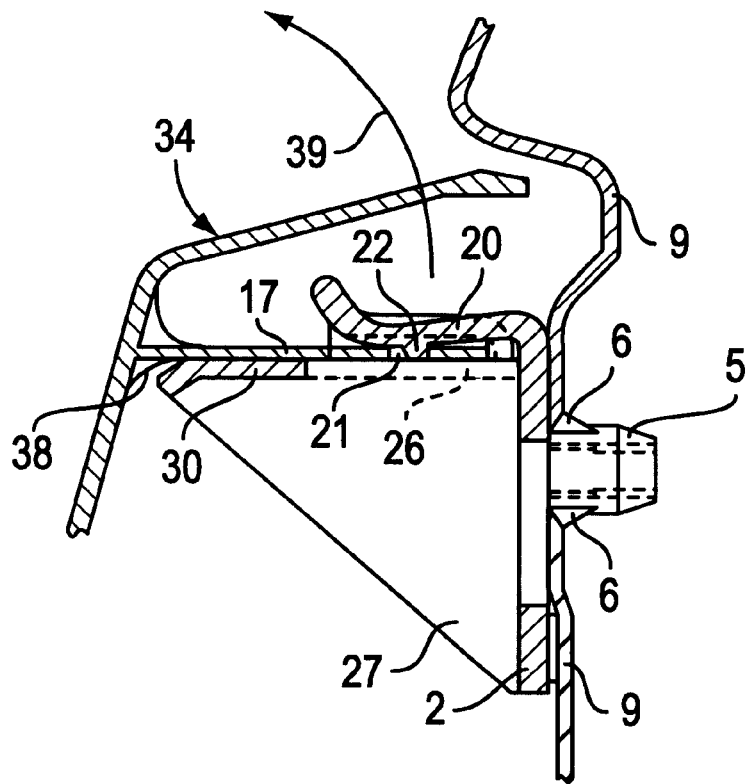
FIG. 6(A) is a sectional view, similar to FIG. 4(A), showing that the bumper is attached to a vehicle body panel.

The present invention is described further by way of an embodiment with reference to accompanying drawings. FIG. 1 is a front view of a holding clip 1 according to the present invention and FIG. 2 is a plan view of the holding clip 1. FIG. 3 is a perspective view as seen from the back of holding clip 1 and FIGS. 4(A) and (B) are sectional views of the holding clip 1 taken along the line A—A and the line B—B of FIG. 1, respectively. FIGS. 5 and 6 are schematic views showing mounting steps of an attachment member on the holding clip 1 and onto a workpiece.

Figure 6B:
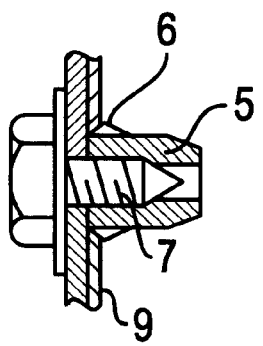
FIG. 6(B) shows an alternative of the fixing portion of FIG. 6(A)
Figure 6C:
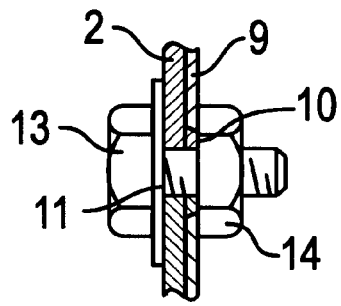
FIG. 6(C) shows another alternative of the fixing portion of FIG. 6(A).

In FIGS. 1 through 4, the holding clip 1 is made of plastic resin and is molded as a one-piece article. The holding clip 1 comprises a base 2 formed as a plate-like member to come in contact with a vehicle body panel as an example of workpieces, a holding portion 3 formed to extend vertically from one of the surfaces of the base 2 for holding the supporting portion of a bumper as an example of attachment members, and fixing portion 5 projecting from the other suce of the base 2. Although one fixing portion 5 is effective for fixing, it is preferable to provide two fixing portions located as illustrated to maintain the proper position and posture of the holding portion 3. Each of the fixing portions 5 has a resilient engagement leg 6 to be fixed when they are inserted into mounting holes in the vehicle body panel. As shown in FIGS. 6(B) and (C), the fixing portions can be of various structures. As long as they are fixable to a vehicle body panel, other structures than the illustrated ones can be adopted. The fixing portion of FIG. 6(B) has the resilient engagement leg 6 and its body is hollowed. When a screw 7 is screwed into the hollowed portion to prevent the engagement leg 6 from bending inwardly so as to enhance the fixing force. The fixing portion of FIG. 6(C) comprises a hole 11 of the base formed in the base 2 which corresponds to a mounting hole 10 in a vehicle body panel 9, and a bolt 13 and a nut 14.

The base 2 is a plate-like member to be in contact with the vehicle body panel and is so adapted that it can be in surface-contact with a large area of the plate-like vehicle body panel to make the fixing to the vehicle body panel firm and stable. The form of the base 2 may be changed in conformity with the form of the vehicle body panel. That is, it is not limited to a plate-like form. As long as the holding portion 3 and the fixing portions 5 are connected and held stably and attached to the vehicle body panel firmly, the base 2 may be in any suitable form. The base 2 may be formed with a hole 15 in the center thereof so as to reduce the weight of the material and to confirm the mounting position on the vehicle body panel.

Figure 4B:
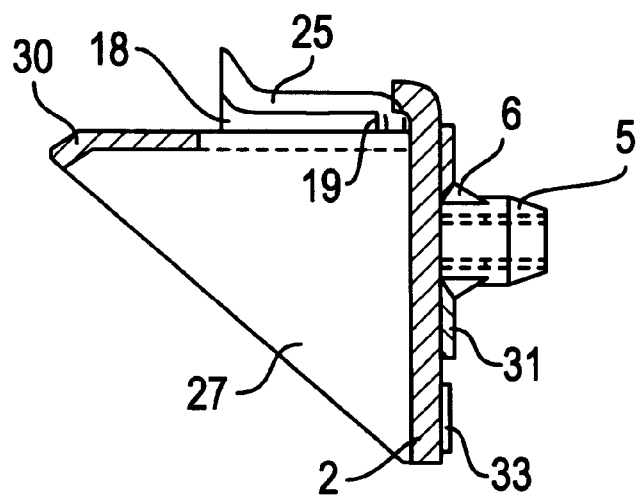
FIG. 4(B) is a section view taken along the line B—B of the clip of FIG. 1.

The holding portion 3 is formed with a receiving portion to receive and hold therein a plate-like supporting portion 17 (see FIG. 5), which is formed on the attachment member such as a bumper with a predetermined width. As is shown best in FIG. 1, the receiving portion is formed as an insertion groove 18 of which the far end is closed, that is, it is in the form of a bag or closed shelf. In FIG. 1, the insertion groove 18 is defined by two wide walls facing each other at upper and lower sides and two narrow walls facing each other at right and left sides. The insertion groove 18 has an inlet which is wider than the supporting portion 17 of the bumper so as to easily receive the supporting portion 17 of the bumper, and its cross section becomes narrower toward the far end to become corresponding to the cross section of the supporting portion 17. The far end of the insertion groove has such a length that it restricts the insertion of the supporting portion 17 to a predetermined depth, so that the position of the bumper is defined in the direction of insertion. To increase the supporting strength for the bumper, it is preferred that the distance to the depth to which the supporting portion 17 is inserted, that is, the extent of insertion is made as long as possible. As shown in FIG. 4(B), the far end of the insertion groove is preferably formed with an abutment rib 19 to settle the extent of insertion. The width of the insertion groove 18 need not necessarily be matched with the size of the supporting portion 17 of the bumper. It may be larger than the bumper supporting portion so as to absorb a pitch error between the bumper supporting portions when a plurality of holding clips are mounted.

A first portion (a center portion in the illustrated example) of a wall (the upper wall in FIG. 1) defining the insertion groove 18 as the receiving portion is formed by a resilient holding member 20 which is associated with an opposite, or lower wall to engage with the supporting portion 17 of the bumper to prevent the supporting portion from getting out. The resilient holding member 20 is formed to increase the height of the insertion groove at its inlet and to reduce the height at the far end so that the inserted supported portion 17 of the bumper can be resiliently pressed against the lower wall. The resilient holding member 20 is formed with, at the center thereof, an engagement protrusion 22 for engagement with an engagement hole 21 at the center of the supporting member 17 of the bumper to prevent the inserted supporting portion 17 from slipping out. As shown in FIG. 1, both sides of the resilient holding member 20 have rigid walls to form wall portions including the corner portions 23 of the insertion groove 18. As is clearly seen in FIG. 1, in each corner portion 23, a wall portion which is C-shaped in section is formed by an L-shaped rigid wall 25 and a lower rigid wall 26. Therefore, these portions of the insertion groove 18 have very high rigidity. In the resilient holding member 20 portion, the supporting portion 17 of the bumper inserted in the insertion groove 18 is supported resiliently in the vertical direction in FIG. 1 but in the corner portions on both sides, it is supported with very high rigidity. Accordingly, when inserted in the insertion groove 18, the supporting portion 17 of the bumper is held very firmly. At the corner portions 23, the insertion groove 18 is expanded not only vertically but also laterally toward opposite sides to facilitate the insertion of the supporting portion 17 of the bumper.

The lower rigid wall 26 defining the insertion groove 18 of the holding portion 3 forms the bottom of the insertion groove 18 extending horizontally. In order to keep its posture horizontal, the outer rigid wall 26 is connected to the base 2 through triangular reinforcing ribs 27 positioned closely to both ends, thereby increasing the strength of the holding portion 3. In a center portion of the rigid wall 26, two reinforcing ribs 29 are provided to further increase the strength of the holding portion 3. The reinforcing ribs 27 and 29 function to keep the insertion groove 18 in a horizontal attitude after insertion of the supporting portion 17 of the bumper. The lower rigid wall 26 extends from the inlet of the insertion groove 28 to the forehand side to form a temporary placing space 30 for the supporting portion 17 of the bumper. When the insertion groove 18 is positioned horizontally, this temporary placing space 30 allows the bumper to stay before its insertion and guides it toward the insertion.

On the surface formed with the fixing portions 5, the base 2 is provided with watertight packings 31. The watertight packings 31 are intended to maintain watertight seal between the base 2 and the vehicle body panel, i.e., the workpiece, and they are provided particularly in the portions where the fixing portions are formed. Generally, they are circular to surround the respective fixing portions 5 as shown by broken lines in FIG. 1. Any other form will do, needless to say. The base 2 is further provided with two abutment portions 33 on the surface which is to be in contact with the vehicle body panel, i.e., the workpiece. The abutment portions 33 adjust the height for the watertight packings 31 to ensure that the base 2 can be mounted in parallel to the vehicle body panel.

Operation for holding a bumper 34 as the attachment member onto the vehicle body panel 9 as the workpiece by using the holding clip 1 as discussed above is explained in the following, with reference to FIGS. 5 and 6(A). The holding clip 1 is attached to the vehicle body panel by inserting the fixing portions 5 of the holding clip 1 into mounting holes in the vehicle body panel 9 as shown in FIG. 6(A). The fixing portions 5 of FIG. 6(A) are fixed to the vehicle body panel when the resilient engagement legs 6 are bent inwardly by the insertion and then the legs project outwardly. In FIG. 6(B), a screw 7 with hexagonal head is screwed in the fixing portion with the aim to strengthen the fixing. In the case of the fixing portion of FIG. 6(C), a combination of a bolt and a nut is used to attain reliable fixing. To the vehicle body panel 9, a plurality of holding clips 1 are attached at predetermined pitch in the longitudinal direction of the bumper to be mounted. After the holding clip 1 is attached to the vehicle boy panel, the supporting portion 17 is placed on the temporary placing space 30 while the bumper 34 is held by a hand, and then the supporting portion 17 is inserted into the insertion groove 18 as the receiving portion of the holding portion 3, as indicated by an arrow 35 in FIG. 5. The bumper 34 is inserted until the supporting portion 17 abuts on the abutment rib 19 (FIG. 4(B)) at the far end of the insertion groove 18. At the end of this insertion, the engagement protrusion 22 provided in the resilient holding member 20 gets in the engagement hole 21 formed in the supporting portion 17 of bumper to prevent the supporting portion 17 from slipping out so as to complete the mounting of the bumper 34 on the vehicle body panel 9 by means of the holding clip 1. In the above explanation, the bumper 34 is attached to the holding clip 1 after the holding clip 1 is attached to the vehicle body panel 9. However, the holding clip 1 can be attached to the bumper 34 before the holding clip 1 is attached to the vehicle body panel 9.

As shown in FIG. 6(A), the mounted bumper 34 receives the force as shown in arrow 39 about a pivot 38 by its own gravity and/or and external pressing-down force. If the holding clip 1 does not have sufficient strength, the upper portion of the bumper tends to be fallen down as a whole. In accordance with the present invention, the holding clip 1 can resist sufficiently the rotating force of the arrow 39 because the insertion groove 18 except the resilient holding member 20 is formed by the rigid walls 25 and 26 of C-shaped cross section including the corner portions 23. This means that the holding clip 1 needs no work to hold the bumper by hands as required in the case of the conventional holding clip which holds only by means of their resilient holding members, and the clip 1 facilitates the bumper mounting operation as well as maintaining high holding force once the bumper is mounted. For example, in a current RV (Recreation Vehicle) car, when the back door is opened and then a baggage from the baggage room is placed on the rear bumper or a person sits on the rear bumper, a force is applied in the direction indicated by the arrow 39 in FIG. 6(A). The holding clip 1 of the present invention sufficiently overcome this force. It is also possible to reduce the number of holding clips 1.

What is claimed is:

1. A bumper holding clip for fastening an attachment member onto a workpiece, comprising:
   a. a base;
   b. a holding portion formed on one of the surfaces of the base for receiving and holding a supporting portion of the attachment member, such as a bumper;
   c. a fixing portion formed on the other surface of the base and adapted to be attached to the workpiece, such as a vehicle body panel;
   d. a receiving portion formed on the holding portion for receiving the supporting portion of the attachment member;
   e. the receiving portion having a central resilient protrusion adapted to engage and hold the support portion of the attachment member to prevent it from slipping out of the holding portion;
   f. the receiving portion of the holding portion defines a bag-like insertion groove having an elongated cross section to receive the plate-like supporting portion of the attachment member; and
   g. the bag-like insertion groove having rigid opposite corners to immovably support the supporting portion of the attachment member within said receiving portion to prevent the body of the attachment member from moving relative to the workpiece.

2. The holding clip according to claim 1, wherein:
   a. an outer wall of the receiving portion is connected to the base by means of reinforcing ribs so that, when the insertion groove is in a horizontal position, the supporting portion of the attachment member received in the insertion groove is kept in the horizontal attitude.

3. The holding clip according to claim 2 wherein when the insertion groove is in a horizontal position, the lower wall of the receiving portion is extended to form a temporary placing space to guide the supporting portion of the attachment member toward the insertion into the insertion groove.

4. The holding clip according to claim 3, wherein:
   a. a mounting hole is formed in the workpiece; and
   b. a resilient engagement leg is formed on the fixed portion to be disposed in the mounting hole of the workpiece to affix the clip to the workpiece.

* * * * *